United States Patent
Genay et al.

(10) Patent No.: US 8,280,253 B2
(45) Date of Patent: Oct. 2, 2012

(54) OPTICAL TELECOMMUNICATIONS NETWORK TERMINAL, AN INSTALLATION INCLUDING THE TERMINAL, AND A METHOD OF DETECTING A BREAK IN OPTICAL TRANSMISSION MEANS

(75) Inventors: Naveena Genay, Lannion (FR); Jean-Luc Courant, Lannion (FR); Philippe Chanclou, Lannion (FR)

(73) Assignee: France Telecom, Paris (FR)

( * ) Notice: Subject to any disclaimer, the term of this patent is extended or adjusted under 35 U.S.C. 154(b) by 1219 days.

(21) Appl. No.: 11/812,626

(22) Filed: Jun. 20, 2007

(65) Prior Publication Data

US 2008/0002971 A1    Jan. 3, 2008

(30) Foreign Application Priority Data

Jun. 30, 2006    (FR) ...................... 06 52757

(51) Int. Cl.
*G01N 21/00* (2006.01)
*H04J 14/00* (2006.01)
*G02B 6/02* (2006.01)

(52) U.S. Cl. ................. 398/79; 398/43; 398/39; 398/42; 398/33; 356/73.1

(58) Field of Classification Search ............ 398/79, 398/34, 25, 28
See application file for complete search history.

(56) References Cited

U.S. PATENT DOCUMENTS

| | | | |
|---|---|---|---|
| 5,285,305 A | 2/1994 | Cohen et al. | |
| 5,598,289 A | 1/1997 | Watanabe | |
| 5,767,956 A | 6/1998 | Yoshida | |
| 5,909,305 A * | 6/1999 | Kinoshita | 359/337.1 |
| 5,943,123 A * | 8/1999 | Oshimi et al. | 356/73.1 |
| 6,396,575 B1 * | 5/2002 | Holland | 356/73.1 |
| 6,459,479 B1 * | 10/2002 | Lee et al. | 356/73.1 |
| 2001/0050768 A1 * | 12/2001 | Uchiyama et al. | 356/73.1 |
| 2003/0067651 A1 * | 4/2003 | Wan et al. | 359/133 |
| 2003/0128946 A1 * | 7/2003 | Glingener et al. | 385/123 |
| 2004/0190897 A1 * | 9/2004 | Satou et al. | 398/25 |
| 2004/0223763 A1 * | 11/2004 | Lee et al. | 398/78 |
| 2007/0127919 A1 * | 6/2007 | Kallstenius | 398/25 |

FOREIGN PATENT DOCUMENTS

EP    0 615 358 A1    9/1994
JP    A 1-276039    11/1989

OTHER PUBLICATIONS

Cho ["Brillouin Based OTDR With Measurement Range of 85 Km Using Combined EDFA and Raman Amplification" Optical Society of America].*

* cited by examiner

*Primary Examiner* — Shi K Li
*Assistant Examiner* — Oommen Jacob
(74) *Attorney, Agent, or Firm* — Oliff & Berridge, PLC

(57) ABSTRACT

An optical telecommunications network terminal includes a device for generating downlink optical signals and a device for receiving uplink optical signals, the optical signals being conveyed in optical transmission means connected to the terminal. More particularly, the generator device is adapted to generate a continuous optical signal at wavelength $\lambda ii$ and having an initial power greater than a power threshold for the occurrence of a stimulated Brillouin effect, above which threshold said continuous optical signal induces in the optical transmission means a continuous Brillouin backscattering uplink optical signal at wavelength $\lambda' ii$. The optical signal receiver device further includes means for analyzing the power of said continuous Brillouin backscattering optical signal at wavelength $\lambda' ii$.

10 Claims, 3 Drawing Sheets

OPTICAL TELECOMMUNICATIONS NETWORK TERMINAL, AN INSTALLATION INCLUDING THE TERMINAL, AND A METHOD OF DETECTING A BREAK IN OPTICAL TRANSMISSION MEANS

The present invention relates to an optical telecommunications network terminal, to an installation including that terminal, and to a method of detecting a break in optical transmission means.

It applies more particularly to a wavelength division multiplex (WDM) optical telecommunications network including a central terminal connected to client terminals by standard optical transmission means, for example telecommunications optical fibers.

Below, "downlink" signal refers to a signal propagating from the central terminal to a client terminal and "uplink" signal refers to a signal propagating in the opposite direction.

There is already known in the art an optical telecommunications network terminal of the type comprising:
 a device for generating downlink optical signals; and
 a device for receiving uplink optical signals;
 the optical signals being conveyed in optical transmission means connected to the terminal, such as optical fibers.

Telecommunications optical fibers can be damaged, or even broken, because they are exposed, for example, to inclement weather (overhead optical fibers) or rodents, or civil engineering works, or flooding (buried optical fibers).

It is therefore beneficial to be able to detect and locate a break in a telecommunications optical fiber quickly in order to be able to respond as soon as possible.

To detect a break, current networks, which are mostly time-division multiplex (TDM) networks, generally employ a technique known as time-domain reflectometry, for example.

This reflectometry technique is based on analyzing the return time of a single-wavelength light pulse sent by the central terminal and partially reflected by Rayleigh backscattering.

That kind of technology is not suited to a WDM-type network, in particular because of the multiplicity of wavelengths of optical signals conveyed in that kind of optical telecommunications network (for each client terminal there is a corresponding signal wavelength).

A WDM network generally includes a central terminal connected by a main optical fiber to a client access node connected to each client terminal by a secondary optical fiber.

Each secondary fiber connecting a client terminal to the telecommunications network access point allows only signals with wavelengths included in a band assigned to the client terminal to pass, and the single-wavelength light pulse can be transmitted only in the secondary optical fiber of the client terminal whose bandwidth includes the wavelength of the pulse.

Consequently, that technology is not suited to a WDM telecommunications network because it is ineffective at detecting a break in a secondary optical fiber.

The invention solves this problem by providing a terminal, for example a central terminal, that can easily be installed in a WDM telecommunications network and can detect a break in an optical fiber at any point of the network.

To this end, the invention provides a telecommunications network terminal of the above type characterized in that the generator device includes means for generating a continuous downlink optical signal in the optical transmission means at wavelength $\lambda_{ii}$ and having an initial power greater than a power threshold for the occurrence of a stimulated Brillouin effect, above which threshold said continuous optical signal induces a continuous Brillouin backscattering uplink optical signal in the optical transmission means at wavelength $\lambda'_{ii}$, and the optical signal receiver device includes means for analyzing the power of said continuous Brillouin backscattering optical signal at wavelength $\lambda'_{ii}$.

Stimulated Brillouin scattering (SBS) is a known non-linear optical phenomenon that produces an optical signal propagating in the opposite direction to the signal transmitted in the optical transmission means.

If a break occurs in the transmission means, the optical power of the Brillouin backscattering signal is modified. This modification of the power of the backscattered signal is a function of the length of optical fiber along which the downlink continuous signal has traveled.

By means of the invention, by analyzing the power of the Brillouin backscattering signal, it is possible to determine from that power the length of optical fiber traveled by the continuous Brillouin backscattering optical signal and therefore to deduce the location of a break in an optical fiber of the telecommunications network from the length so determined.

The initial power of a signal refers to the power at which the optical source sends the signal.

For example, the power threshold for the occurrence of the stimulated Brillouin effect is defined as the minimum initial power of the continuous downlink optical signal for which the power of that continuous optical signal transmitted in the optical fibers to the client terminal is equal to the power of the Brillouin backscattering optical signal at wavelength $\lambda'_{ii}$.

The Brillouin backscattering signal has a wavelength $\lambda'_{ii}$ significantly different from the wavelength $\lambda_{ii}$ of the continuous downlink optical signal.

For example, for a continuous downlink optical signal at wavelength $\lambda_{ii}$=1550 nanometers (nm), the Brillouin backscattering optical signal has a wavelength of around $\lambda'_{ii}$=1550.088 nm.

Furthermore, the continuous downlink optical signal transmitted in the telecommunications network to a client terminal can advantageously be modulated and reflected by that client terminal to transmit data from that client terminal to the central terminal at the wavelength $\lambda_{ii}$. This is known in the art.

As the Brillouin backscattering signal has a wavelength $\lambda'_{ii}$ different from the wavelength $\lambda_{ii}$ of the modulated uplink optical signal carrying data, the Brillouin backscattering signal does not interfere with the uplink signal.

Accordingly, by means of the invention, a break can be detected without interrupting transmission of data to client terminals.

To determine the length of fiber before the break, the analyzer means advantageously include means for measuring the power of the signal and means for determining an optical fiber length as a function of the measured power.

The generator device also includes means for generating a modulated downlink optical signal at wavelength $\lambda_i$ for transmitting data in the optical transmission means, for example to a client terminal.

Because of this, a break can be detected during bidirectional transmission of data between the central terminal and the client terminal without interrupting the transmission of data.

Furthermore, the analyzer means advantageously include a detector unit for detecting the Brillouin backscattering optical signal and a signal processing unit. The detector unit includes a detector for converting the optical signal into an electrical signal and the signal processing unit includes the means for measuring the power of the signal and the means for determining an optical fiber length as a function of the measured power.

In one embodiment, the means for determining an optical fiber length include means for storing a table of correspondences between a set of fiber length values and a set of power values and means for comparing the measured power with power values from the table of correspondences.

The detector unit includes a single optical detector, for example.

The optical detector includes a photodiode responsive to the wavelengths $\lambda'_{ii}$ and $\lambda_{ii}$, for example. Thus the detector unit employs relatively simple means of relatively low cost.

Under such circumstances, to discriminate the modulated electrical signal carrying data from the continuous electrical signal corresponding to the Brillouin backscattering signal, the detector unit includes an electrical circuit including a first branch for electrical transmission of a continuous signal including a low-pass filter and electrically connected to the optical detector and to the electrical signal processing unit and a second branch for electrical transmission of a modulated signal including a high-pass filter and electrically connected to the optical detector and to means in the receiver device for demodulating the modulated signal.

In one embodiment, to improve filtering of the signals, the detector unit includes first and second optical detectors, for example two photodiodes.

Under such circumstances, the first and second optical detectors are connected to first and second optical transmission branches, respectively, the first optical transmission branch including a band-pass optical filter centered on the wavelength $\lambda'_{ii}$ of the Brillouin backscattering signal.

The detector unit includes a first branch for electrical transmission of a continuous signal including a low-pass electrical filter and electrically connected to the first optical detector and to the signal processing unit and a second branch for electrical transmission of a modulated signal including a high-pass electrical filter and electrically connected to the second optical detector and to means in the receiver device for demodulating the modulated signal.

Accordingly, in this embodiment, the combination of optical filtering and electrical filtering improves the quality of filtering and consequently the accuracy of the measurement of the power of the Brillouin backscattering signal.

The invention also provides an optical telecommunications network installation including a central terminal connected to a client terminal via optical transmission means, characterized in that the central terminal is a terminal according to the invention.

The invention further provides a method of detecting a break in optical transmission means connecting a central terminal and a client terminal of an optical telecommunications network, the method including the following steps:

the central terminal generating a continuous downlink optical signal at wavelength $\lambda_{ii}$; and transmitting that signal to the client terminal in the optical transmission means;

which method is characterized in that the continuous downlink optical signal at wavelength $\lambda_{ii}$ has an initial power greater than a threshold for the occurrence of a stimulated Brillouin effect, above which threshold the continuous optical signal induces a Brillouin backscattering uplink optical signal at wavelength $\lambda'_{ii}$, and includes a step of the central terminal analyzing the power of the Brillouin backscattering uplink optical signal of wavelength $\lambda'_{ii}$.

The invention can be better understood on reading the following description, which is given by way of example only and with reference to the drawings, in which:

FIG. 1 shows an optical telecommunications network installation 10 of the invention.

Figure 1:
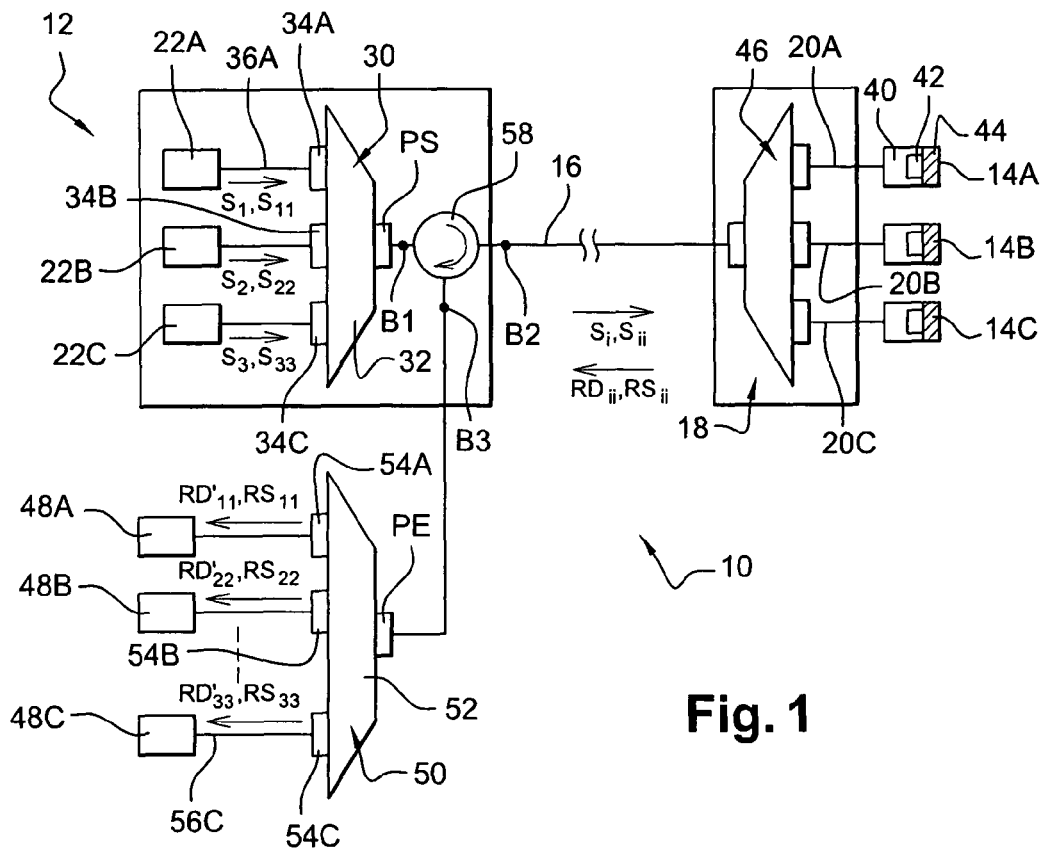
FIG. 1 is a diagrammatic view of an optical telecommunications network installation of the invention.

The installation 10 includes a central terminal 12 and one or more client terminals 14. FIG. 1 shows three client terminals 14A, 14B and 14C.

The installation 10 also includes optical transmission means including a main optical fiber 16 for transmitting data between the central terminal 12 and the client terminals 14, for example.

The optical installation 10 generally also includes a client access node 18 for connecting the client terminals 14 to the main optical fiber 16. The client terminals 14A, 14B, 14C are connected to the access node 18 by secondary optical fibers 20A, 20B, 20C, respectively.

The central terminal 12 includes one or more generator devices 22 for generating downlink optical signals. In this example, the central terminal 12 includes three generator devices 22A, 22B, 22C.

The generator devices 22A, 22B, 22C include respective means 23A, 23B, 23C for generating respective modulated downlink optical signals $S_1, S_2, S_3$ at respective wavelengths $\lambda_1, \lambda_2, \lambda_3$ for transmitting data to the corresponding client terminals 14A, 14B, 14C.

Figure 2:
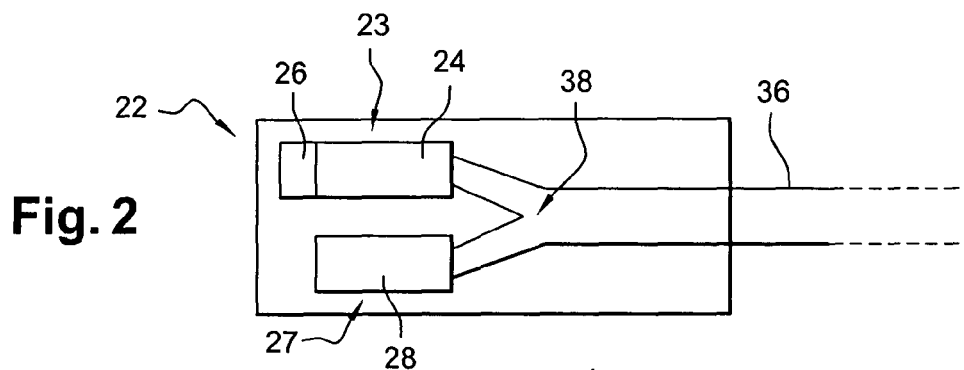
FIG. 2 is a diagrammatic view of a generator device of the FIG. 1 terminal.

To this end, the generator means 23 each include a first optical source 24 of wavelength $\lambda_i$ and modulator means 26 for modulating the output of the first source 24 (FIG. 2).

The first optical sources 24A, 24B, 24C (not shown in the figures) of the respective generator means 23A, 23B, 23C have different wavelengths $\lambda_1, \lambda_2, \lambda_3$.

Figure 3:
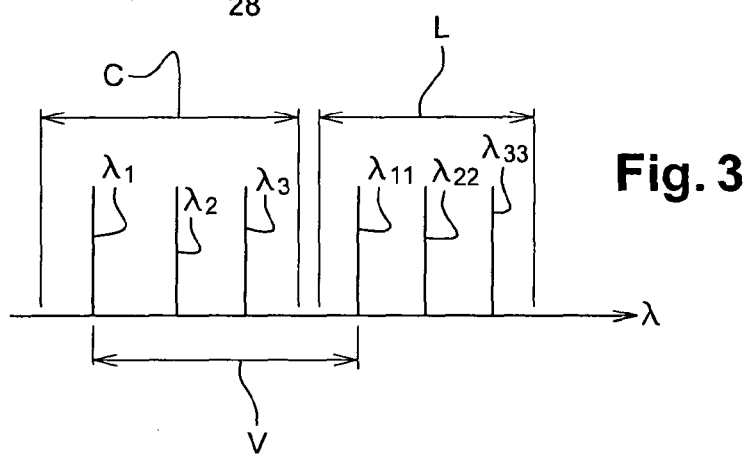
FIG. 3 is a diagram of the division of signal wavelengths into two bands of wavelengths.

The wavelength $\lambda_1, \lambda_2, \lambda_3$ are contained in a first band of wavelengths extending from 1525 nm to 1565 nm, for example, generally designated "band C" (FIG. 3).

Moreover, each generator device 22 also includes generator means 27 for generating a continuous downlink optical signal $S_{ii}$ at wavelength $\lambda_{ii}$ in addition to the modulated optical signal $S_i$ at wavelength $\lambda_i$.

The generator means 27A, 27B, 27C are thus adapted to generate the respective continuous downlink optical signals $S_{11}, S_{22}, S_{33}$ at respective wavelengths $\lambda_{11}, \lambda_{22}, \lambda_{33}$ transmitted to the corresponding client terminals 14A, 14B, 14C.

To this end, the generator means 27 each also include a second optical source 28 of wavelength $\lambda_{ii}$.

The second optical sources 28A, 28B, 28C (not shown in the figures) of the respective generator means 27A, 27B, 27C have different wavelengths $\lambda_{11}, \lambda_{22}, \lambda_{33}$.

The wavelengths $\lambda_{11}, \lambda_{22}, \lambda_{33}$ are contained in a band of wavelengths extending from 1570 nm to 1610 nm, for example, generally designated "band L" (FIG. 3).

The optical sources 24 and 28 include laser diodes and are grouped together in its standard laser diode strip (not shown), for example.

The central terminal 12 also includes an optical signal inserter device 30 for inserting the downlink optical signals $S_i$ and $S_{ii}$ generated by each generator device 22 into the main optical fiber 16.

In this example, the central terminal 12 includes a wavelength division multiplexer 32 for optical signals forming an inserter device 30 common to the three generator devices 22A, 22B, 22C.

The optical signal multiplexer 32 has a first input port 34A, a second input port 34B, and a third input port 34C connected to the first optical signal generator device 22A, the second optical signal generator device 22B, and the third optical signal generator device 22C, respectively, by secondary optical fibers 36A, 36B, 36C, respectively.

In the conventional way, the multiplexer 32 also includes an output port PS for the multiplexed signals $S_1$, $S_2$, $S_3$ connected to the main optical fibers 16.

In this example, the multiplexer 32 is of the type in which an input port is common to the generator means 23 for generating the continuous optical signal and to the generator means 27 for generating the modulated optical signal.

Thus the geometrical parameters of the multiplexer 32 are chosen so that it is "cyclic". More precisely, the distribution of the wavelengths in the input ports 34 is identical at a regular wavelength interval V (FIG. 3) usually called the free spectral interval of the multiplexer.

For example, as seen in FIG. 3, the wavelengths $\lambda_1$ and $\lambda_{11}$ of the signals $S_1$ and $S_{11}$ are separated by an interval V. consequently, the signals $S_1$ and $S_{11}$ are fed to the same input port 34A. In a similar manner, the signals $S_2$ and $S_{22}$ and the signals $S_3$ and $S_{33}$ are fed to the same input ports 34B and 34C, respectively.

Furthermore, the first optical source 24 and the second optical source 28 are coupled to each other by standard optical signal coupling means 38 for their insertion into the corresponding secondary optical fiber 36, for example. The coupling means 38 include a standard 3 dB coupler, for example (FIG. 2).

According to the invention, the initial power of the continuous optical signal $S_{ii}$ (the output power of the optical source 28) is above a power threshold for the occurrence of the stimulated Brillouin effect, above which threshold the continuous optical signal $S_{ii}$ induces a continuous uplink Brillouin backscattering optical signal $RD'_{ii}$ at wavelength $\lambda_{ii}$.

The wavelength $\lambda'_{ii}$ of the Brillouin backscattering signal $RD'_{ii}$ is generally greater than the wavelength of the continuous optical signal $S_{ii}$. For example, if the wavelength $\lambda_{ii}$ is 1550 nm, the wavelength $\lambda'_{ii}$ is 1550.088 nm.

The downlink optical signals $S_{ii}$ and $S_i$ are transmitted from the central terminal 12 to the client terminals 14 in the main optical fiber 16.

Moreover, to transmit data from a client terminal 14 to the central terminal 12, each client terminal 14 includes a device 40 for creating a modulated uplink optical signal $RS_{ii}$ at wavelength $\lambda_{ii}$ from the continuous downlink optical signal $S_{ii}$ at wavelength $\lambda_{ii}$.

Each device 40 preferably includes means 42 for modulating and means 44 for reflecting the continuous downlink optical signal $S_{ii}$ at wavelength $\lambda_{ii}$ generated by the central terminal 12.

The reflector means 44 can also amplify the uplink optical signal $RS_{ii}$ at wavelength $\lambda_{ii}$.

In the example shown, the access node 18 conventionally includes an optical signal wavelength multiplexer-demultiplexer 46 for distributing the downlink signals $S_{ii}$ and $S_i$ to the secondary optical fibers 20 connected to the client terminals 14 and for wavelength division multiplexing the uplink optical signals $RD'_{ii}$, $RS_{ii}$ for transmitting the uplink optical signals in the optical fiber 16.

In order to receive the uplink optical signals $RD'_{ii}$, $RS_{ii}$, the central terminal 12 also includes one or more uplink optical signal receiver devices 48. In the example shown in FIG. 1, the central terminal 12 includes three uplink optical signal receiver devices 48A, 48B, 48C.

In order to extract the uplink optical signals from the main optical fiber 16, the central terminal 12 preferably also includes an uplink signal extractor device 50.

In this example, the central terminal 12 includes an optical signal wavelength demultiplexer 52 forming an extractor device 50 common to the three receiver devices 48A, 48B, 48C.

The demultiplexer 52 includes a first output port 54A, a second output port 54B, and a third output port 54C connected to the first optical signal receiver device 48A, the second optical signal receiver device 48B, and the third optical signal receiver device 48C, respectively, by respective secondary optical fibers 56A, 56B, 56C.

The demultiplexer 52 further includes an input port PE for multiplexed uplink optical signals in the optical fiber 16 and distributes the uplink optical signals to the output ports 54 as a function of their wavelength.

The demultiplexer 52 therefore has geometrical parameters identical to those of the multiplexer 32 and is also cyclic. As the difference between the wavelengths $\lambda_{ii}$ and $\lambda'_{ii}$ is relatively small (less than 0.1 nm), the signals $RD'_{ii}$ and $RS_{ii}$ are directed to the same output port 46.

The uplink optical signals are therefore distributed into the output ports 54 as follows:
the signals $RD'_{11}$ and $RS_{11}$, are directed to the same output port 54A;
the signals $RD'_{22}$ and $S_{22}$ are directed to the same output port 54B;
the signals $RD'_{33}$ and $S_{33}$ are directed to the same output port 54C.

As seen in FIG. 1, the multiplexer 32 and the demultiplexer 52 are connected to the main optical fiber 16 by a circulator 58.

A circulator is a known optical component including one or more optical isolators (not shown).

In the conventional way, the circulator 58 has three terminals. A first terminal is connected to the output port PS of the multiplexer 32, a second terminal is connected to an input port PE of the multiplexer 52, and a third terminal B3 is connected to the main optical fiber 16.

This circulator 58 is placed in the installation 10 so that:
an uplink optical signal in the fiber 16 is transmitted from the terminal B2 to the terminal B3 in the input port PE of the demultiplexer 52;
an downlink optical signal coming from the output port PS of the multiplexer 32 is transmitted from the terminal B1 to the terminal B2 in the main optical fiber 16;
no signal is transmitted from the terminal B1 to the terminal B3.

Alternatively, the multiplexer 32 and the demultiplexer 52 form a single device for simultaneously inserting and extracting downlink or uplink optical signals.

Figure 4:
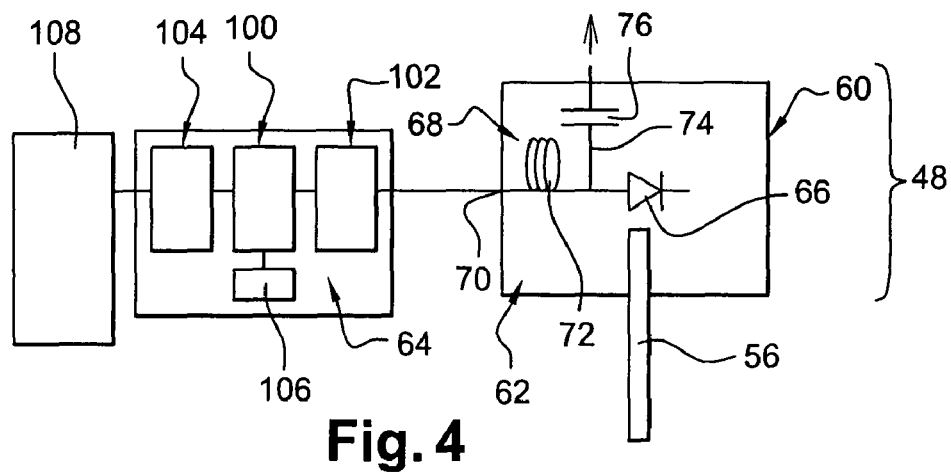
FIG. 4 is a diagrammatic view of analyzer means of a receiver device of the terminal from FIG. 1.

Each receiver device 48 includes means 60 for analyzing the Brillouin backscattering signal $RD'_{ii}$ (FIG. 4).

In this example, the analyzer means 60 include a unit 62 for detecting the Brillouin backscattering optical signal including an optical detector 66 adapted to convert the optical signal into an electrical signal.

The analyzer means 60 further include a unit 64 for processing this electrical signal.

As shown in FIG. 4, the detector unit 62 includes a single optical detector 66, for example a photodiode. Under such circumstances, the secondary optical fiber 56 for connecting the output port 54 to the corresponding receiver device 48 has a single optical transmission branch connected to the output port 54 and to the optical detector 66.

Furthermore, the detector unit 62 includes an electrical circuit 68 including a first branch 70 electrically connected to the optical detector 62 and to the electrical signal processing unit 64 for the electrical transmission of a continuous signal, in particular the signal $RD'_{ii}$.

This first branch 70 includes a low-pass electrical filter 72 for eliminating the uplink modulated signal $RS_{ii}$.

Where appropriate, the electrical circuit 68 includes a second branch 74 for the electrical transmission of a modulated signal, in particular the signal $RS_{ii}$, electrically connected to the optical detector 62 and to means (not shown) in the receiver device 48 for demodulating the modulated signal.

This second branch 74 includes a high-pass electrical filter 76 for eliminating the continuous signal detected by the photodiode 56.

Figure 5:
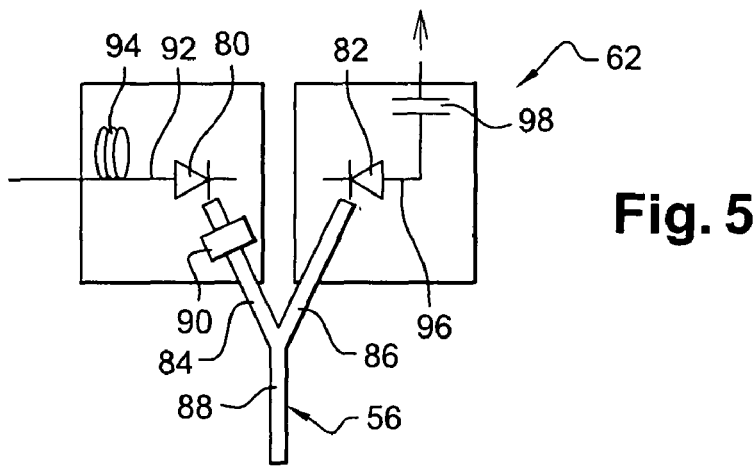
FIG. 5 is a diagrammatic view of a variant of the analyzer means from FIG. 4.

In a variant shown in FIG. 5, the detector unit 62 includes a first optical detector 80 and a second optical detector 82.

Under such circumstances, the secondary optical fiber 56 for connecting the output port 54 to the corresponding receiver device 48 includes a first secondary optical transmission branch 84 and a second secondary optical transmission branch 86 connected to the first optical detector 80 and the second optical detector 84, respectively, and to a main optical transmission branch 88 connected to the output port 54.

For example, the first and second optical transmission branches 84 and 86 are connected to each other and to the main branch 88 by a standard 3 dB coupler.

The first secondary optical transmission branch 84 preferably includes a band-pass optical filter 90 centered on the wavelength $\lambda'_{ii}$ of the Brillouin backscattering signal $RD'_{ii}$ to eliminate the modulated optical signal $RS_{ii}$ in the first secondary optical transmission branch 84.

In this example, the detector unit 62 includes a first branch 92 for the electrical transmission of a continuous signal including a low-pass electrical filter 94 and electrically connected to the first optical detector 80 and to the signal processor unit 64.

The detector unit 62 further includes a second branch 96 for the electrical transmission of a modulated signal including a high-pass electrical filter 98 and electrically connected to the first optical detector 80 and to the means in the receiver device 48 for demodulating the modulated signal.

In the example described, the electrical signal processor unit 64 includes means 100 for measuring the power of the electrical signal. In the conventional way, the electrical signal processor unit 64 includes analog-digital converter means 102 and digital-analog converter means 104 for the electrical signals.

Moreover, the unit 64 also includes means 106 for determining a fiber length as a function of the measured power of the signal $RD'_{ii}$.

For example, the means 106 include means (not shown) for storing a table of correspondences between a set of fiber length values and a set of power values and means for comparing the measured power with power values from the table of correspondences.

Where appropriate, the analyzer means 60 further include a unit 108 for displaying a result, for example a fiber length in km.

Certain aspects of the method of detecting a break in an optical fiber of the optical installation 10 are described below.

The stimulated Brillouin effect occurrence threshold is preferably determined before applying the method of the invention for detecting a break. In this example, this threshold is determined for a total fiber length of 20 km between the output port PS of the multiplexer 32 of the central terminal 12 and each client terminal 14.

Figure 6:
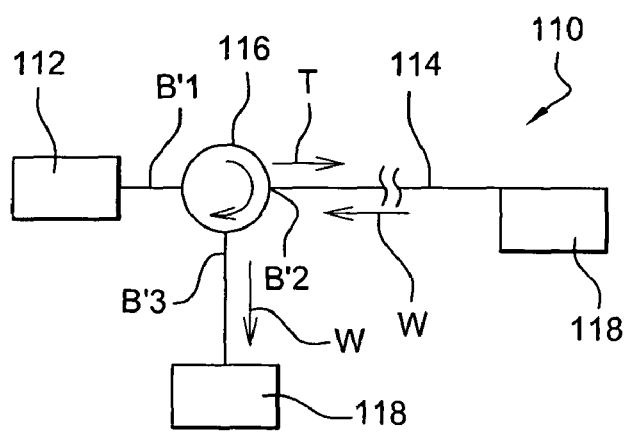
FIG. 6 is a diagrammatic view of a device for determining the threshold for occurrence of the Brillouin effect.

The stimulated Brillouin effect occurrence threshold is determined experimentally using a device 110 shown in FIG. 6, for example.

That device 110 includes a laser optical source 112 connected to a 20 km long optical fiber 114 through a circulator 116 that operates in exactly the same way as the circulator 58 described above. The optical source 112 produces a downlink optical signal T.

The terminal B'1 of the circulator 116 is connected to the laser optical source 112, the terminal B'2 is connected to one end of the optical fiber 114, and the terminal B'3 is connected to a standard power measuring device 118 for determining the power of the backscattered optical signals.

The other end of the optical fiber 114 is also connected to a power measuring device 118 for determining the power of the transmitted optical signals.

The transmitted power is measured for the optical signal T and a Brillouin backscattering signal W for different values of the initial power of the continuous signal T produced by the optical source.

Figure 7:
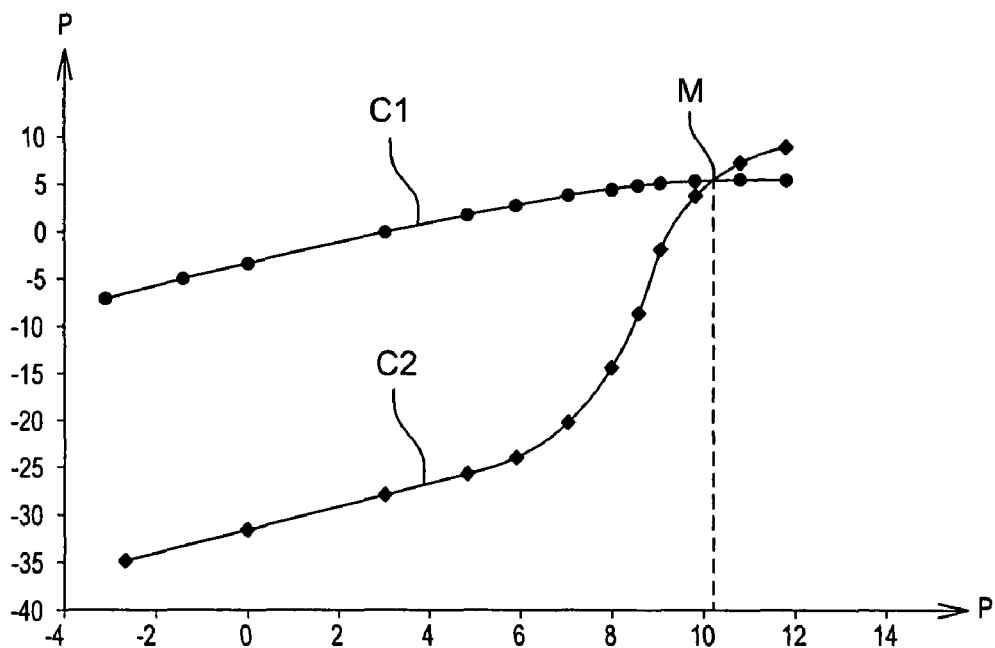
FIG. 7 is a graph representing the power of a continuous optical signal transmitted in an optical fiber by the device from FIG. 6 and the power of that optical signal backscattered in the fiber, as a function of the initial power of the optical signal.

This yields the FIG. 7 graph. The curves C1 and C2 respectively represent the transmitted power P of the continuous optical signal T and the Brillouin backscattering signal W as a function of the initial power P of the optical signal T produced by the optical source 110. The powers are expressed in dBm, a standard unit for expressing power levels in dB relative to a reference level of 1 mW: $X_{dBm} = 10 \log_{10}(X_{mW}/X_0)$, where $X_0 = 1$ mW, $X_{mW}$ is a power X expressed in mW and $X_{dBm}$ is the power X expressed in dBm.

In the FIG. 7 graph, starting from an injected power of 6 dBm, the curve C2 represents a non-linear function corresponding to the non-linear optical phenomenon known as the stimulated Brillouin effect. Below 6 dBm, the curve C2 represents a substantially linear function, corresponding to the phenomenon known as Rayleigh backscattering.

The Brillouin phenomenon occurrence power threshold is preferably chosen to be the initial power of the signal produced by the optical source 110, corresponding to the abscissa at the point of intersection M of the two curves C1 and C2.

An initial power of the downlink continuous optical signal greater than 10 dBm is therefore used in the remainder of the description.

In this example, the secondary optical fiber 20A connecting the client terminal 14A to the access point 18 has a break X located at a fiber length of 15 km from the output port PS of the multiplexer 32 of the central terminal 12. The total fiber length between this output port PS and the client terminal 14A is 20 km, for example.

When the optical installation 10 is operating, each generator device 22 of the central terminal 12 generates a modulated optical signal $S_i$ carrying data at a wavelength $\lambda_i$ for the transmission of data and a downlink continuous optical signal at a wavelength $\lambda_{ii}$ that is sent to the corresponding client terminal 14 for the purpose of detecting a break.

In accordance with the invention, the continuous downlink optical signal $S_{ii}$ at wavelength $\lambda_{ii}$ has an initial power above the stimulated Brillouin effect occurrence power threshold determined beforehand by means of the device 110, above which threshold the continuous downlink optical signal $S_{ii}$ induces an uplink Brillouin backscattering optical signal at wavelength $\lambda'_{ii}$.

Each client terminal 14 receives the downlink signals and produces from the continuous downlink optical signal at wavelength $\lambda_{ii}$ a modulated uplink optical signal $RS_{ii}$ at wavelength $\lambda_{ii}$ for transmitting data to the central terminal 12.

In order to created an uplink signal $RS_{ii}$ carrying data, each client terminal 14 preferably modulates and reflects the continuous downlink signal $S_{ii}$.

As the secondary optical fiber 20A includes a break X, the receiver device 48A of the central terminal 12 corresponding to the client terminal 14A no longer receives modulated uplink optical signals $RS_{11}$ carrying data from the client terminal 14A. In contrast, the receiver device 48A continues to receive the continuous Brillouin backscattering uplink optical signal $RD'_{11}$.

In accordance with the detection method of the invention, in order to detect the break, the receiver device 48A of the central terminal 12 analyses the power of the Brillouin backscattering optical signal $RD'_{11}$.

During the analysis step, the receiver device 48A preferably compares the power of the Brillouin backscattering optical signal $RD'_{ii}$ with the table of correspondences between a set of fiber length values and a set of power values.

For example, the table of correspondences is drawn up experimentally beforehand by measuring the power of a Brillouin backscattering signal for different fiber lengths.

Figure 8:
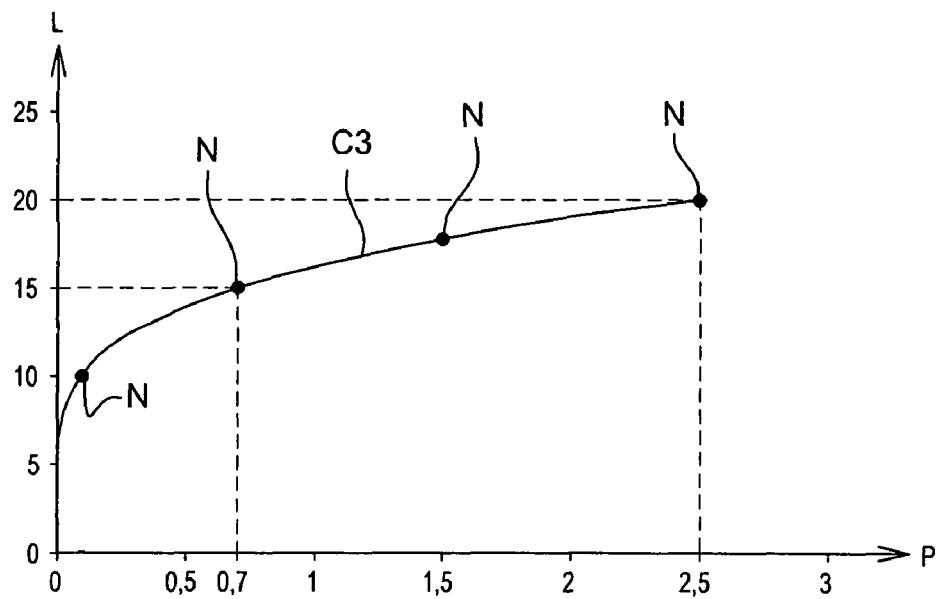
FIG. 8 is a graph of fiber length as a function of the power of a Brillouin backscattering signal.

Thus the FIG. 8 graph shows the curve C3 representing the fiber length L in kilometers (km) as a function of the power P of the Brillouin backscattering signal in mW. The set of fiber length values and the set of power values are respectively the ordinates and the abscissae of points N on the curve C3.

For a fiber length of 20 km, the power of the Brillouin backscattering signal must be 2.5 mW.

Now, because of the break X in the secondary fiber 20A located 15 km from the central terminal 12, the signal $RD'_{11}$ has a lower measured power of 0.7 mW.

The comparison means compare this measured power with a power value from the set of power values and then determine the corresponding fiber length value in the table.

In the example described, the corresponding fiber length value is 15 km.

Alternatively, the length L of cut optical fiber is determined by calculation using a mathematical equation describing the physical phenomenon of the stimulated Brillouin effect. This mathematical equation can also be stored in the storage means.

The receiver device 48A then displays the result, for example the fiber length L before the break, which is 15 km in this example.

The invention claimed is:

1. An optical telecommunications network terminal including:
    a generator device for generating downlink optical signals; and
    an optical signal receiver device for receiving uplink optical signals;
    the optical signals being conveyed in optical transmission means connected to the terminal,
    wherein the generator device includes means for generating a continuous downlink optical signal in the optical transmission means at wavelength $\lambda ii$ and having an initial power greater than a power threshold for the occurrence of a stimulated Brillouin effect, above which threshold said continuous optical signal induces a continuous Brillouin backscattering uplink optical signal in the optical transmission means at wavelength $\lambda'ii$, and the optical signal receiver device includes means for analyzing the power of said continuous Brillouin backscattering optical signal at wavelength $\lambda'ii$, and
    the optical transmission means include an optical fiber and the analyzer means include means for measuring the power of the Brillouin backscattering signal and means for determining an optical fiber length as a function of the measured signal power.

2. A terminal according to claim 1, wherein the generator device also includes means for generating in the optical transmission means a modulated downlink optical signal at wavelength $\lambda i$ for transmitting data.

3. A terminal according to claim 1, wherein the determination means include means for storing a table of correspondences between a set of fiber length values and a set of power values and means for comparing the measured power with power values from the table of correspondences.

4. A terminal according to claim 1, wherein the analyzer means include:
    a unit for detecting the Brillouin backscattering optical signal, including a detector for converting the optical signal into an electrical signal; and
    a unit for processing the electrical signal including the measuring means and the means for determining an optical fiber length.

5. A terminal according to claim 4, wherein the detector unit includes a detector and an electrical circuit including a first branch for the electrical transmission of a continuous signal including a low pass filter and electrically connected to the optical detector and to the electrical signal processor unit.

6. A terminal according to claim 5, wherein the electrical circuit includes a second branch for the electrical transmission of a modulated signal including a high pass filter and electrically connected to the optical detector and to means in the optical signal receiver device for demodulating the modulated signal.

7. A terminal according to claim 4, wherein the detector unit includes a first optical detector and a second optical detector connected to a first optical transmission branch and a second optical transmission branch, respectively, the first optical transmission branch including a band pass optical filter centered on the wavelength of the Brillouin backscattering signal.

8. A terminal according to claim 7, wherein the detector unit includes:
    a first branch for the electrical transmission of a continuous signal including a low pass electrical filter and electrically connected to the first optical detector and to the signal processor unit; and
    a second branch for the electrical transmission of a modulated signal including a high pass electrical filter and electrically connected to the second optical detector and to means in the optical signal receiver device for demodulating the modulated signal.

9. An optical telecommunications network installation including a central terminal connected to a client terminal via optical transmission means, characterized in that the central terminal is a terminal according to claim 1.

10. A method of detecting a break in optical transmission means connecting a central terminal and a client terminal of an optical telecommunications network, the method including the following steps:

the central terminal generating a continuous downlink optical signal at wavelength $\lambda ii$;

transmitting that signal to the client terminal in the optical transmission means, the optical transmission means including an optical fiber, wherein the continuous downlink optical signal at wavelength $\lambda ii$ has an initial power greater than a threshold for the occurrence of a stimulated Brillouin effect, above which threshold the continuous optical signal induces a Brillouin backscattering uplink optical signal at wavelength $\lambda'ii$;

the central terminal measuring the power of the Brillouin backscattering uplink optical signal at wavelength $\lambda'ii$; and determining an optical fiber length as a function of the measured signal power.

* * * * *